H. E. SMYTHE.
REGENERATIVE FURNACE.
APPLICATION FILED MAY 15, 1915.
1,222,690.
Patented Apr. 17, 1917.
4 SHEETS—SHEET 3.
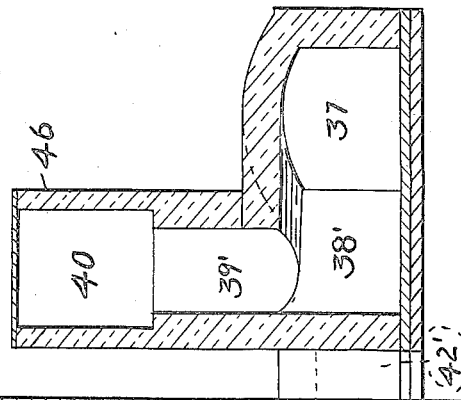
Fig. 4.
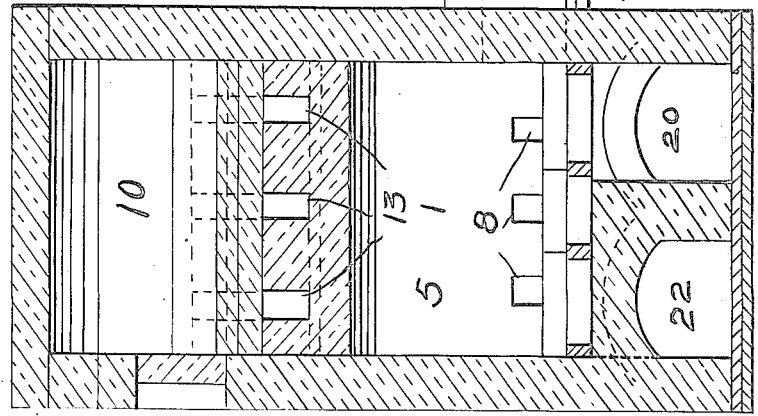
Fig. 5.
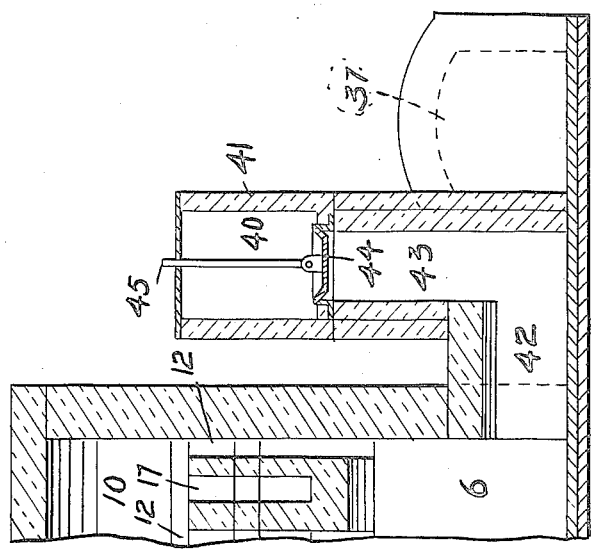
WITNESS
R. F. Dilworth
INVENTOR
H. E. Smythe
by F. N. Barber
attorney

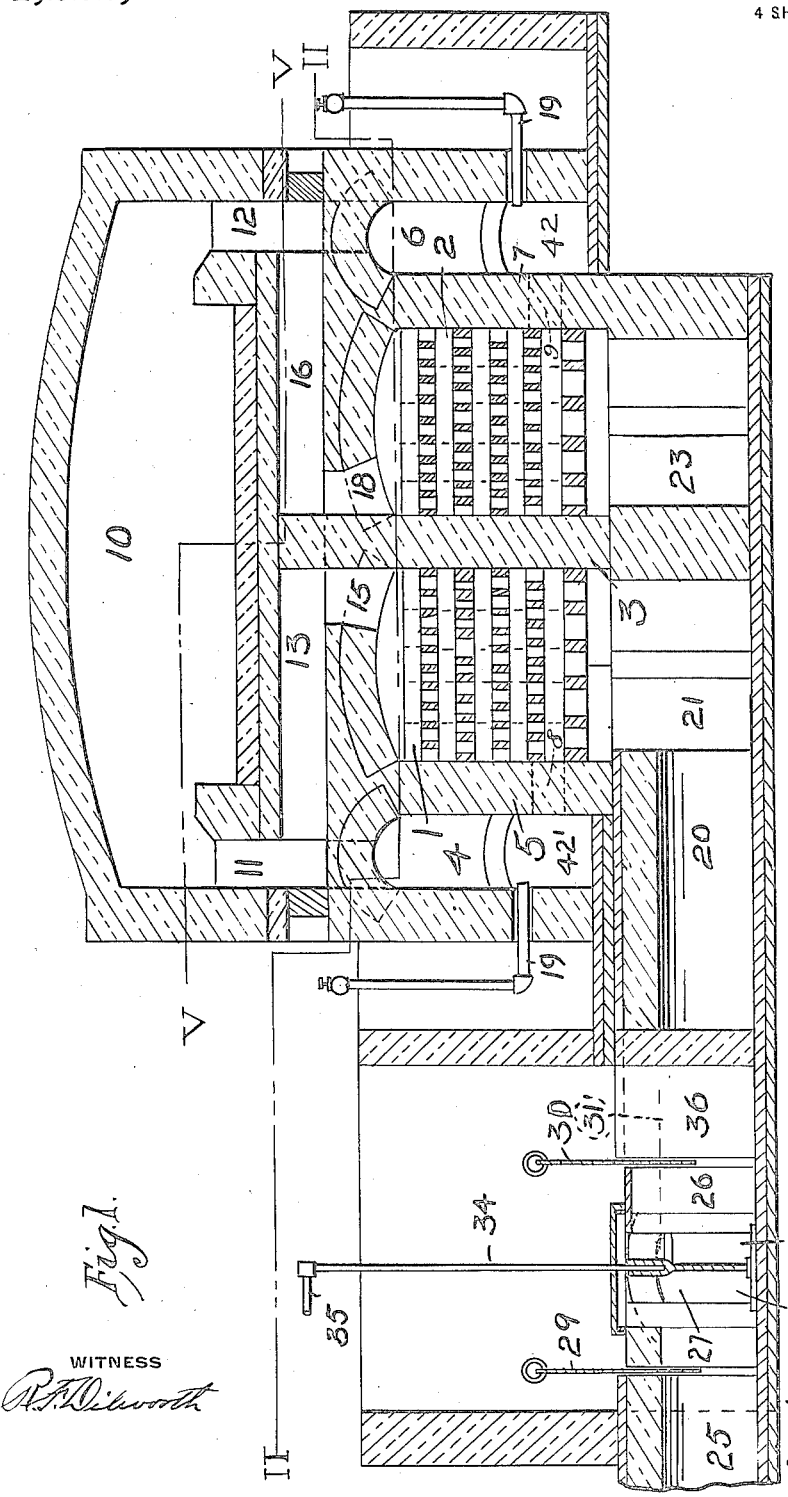

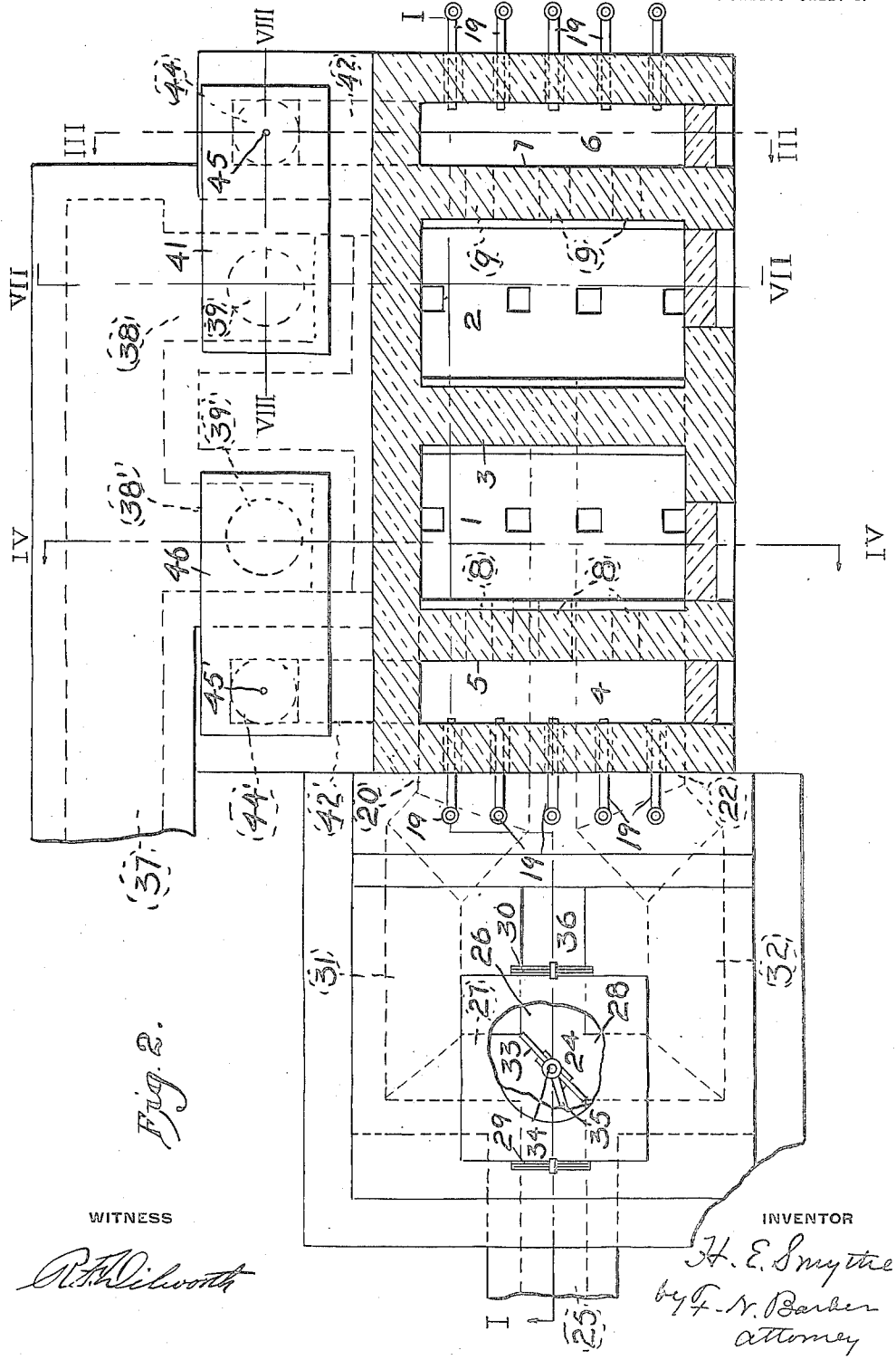

H. E. SMYTHE.
REGENERATIVE FURNACE.
APPLICATION FILED MAY 15, 1915.

1,222,690.

Patented Apr. 17, 1917.
4 SHEETS—SHEET 4.

INVENTOR

UNITED STATES PATENT OFFICE.

HORACE E. SMYTHE, OF PITTSBURGH, PENNSYLVANIA, ASSIGNOR TO THE S. R. SMYTHE COMPANY, OF PITTSBURGH, PENNSYLVANIA, A CORPORATION OF WEST VIRGINIA.

REGENERATIVE FURNACE.

1,222,690.

Specification of Letters Patent.

Patented Apr. 17, 1917.

Application filed May 15, 1915. Serial No. 28,333.

*To all whom it may concern:*

Be it known that I, HORACE E. SMYTHE, a citizen of the United States, residing at Pittsburgh, in the county of Allegheny and State of Pennsylvania, have invented new and useful Improvements in Regenerative Furnaces, of which the following is a specification.

My invention relates to regenerative furnaces. The principal object of my invention is to provide a furnace in which the preheated air supply is divided, a portion thereof meeting the fuel gas in a preliminary combustion chamber and the remainder of the air meeting the partially consumed gas and air in the furnace chamber where the combustion is completed. Another object is to keep the hearth of the furnace hot by causing the preheated air and gas, and the waste gases to pass beneath the hearth and close thereto. Another object is to design a furnace that may consume natural gas or producer gas without changing the construction of the furnace or closing it down. Other objects will appear hereinafter.

Figure 5:
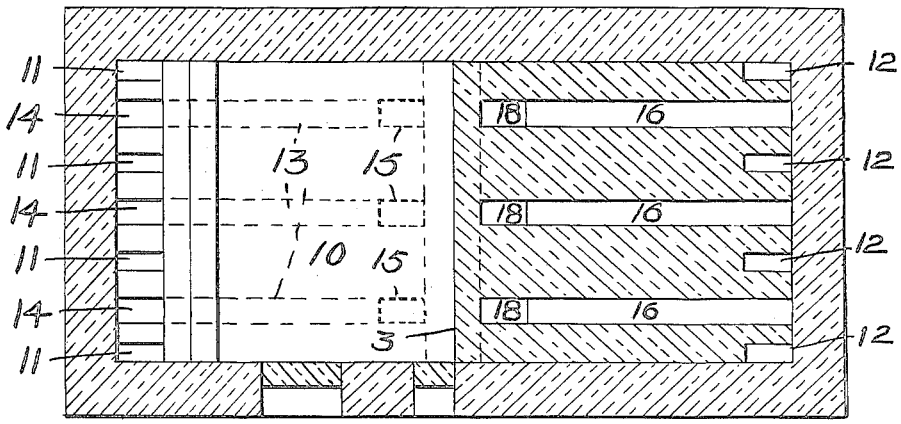
Figure 6:
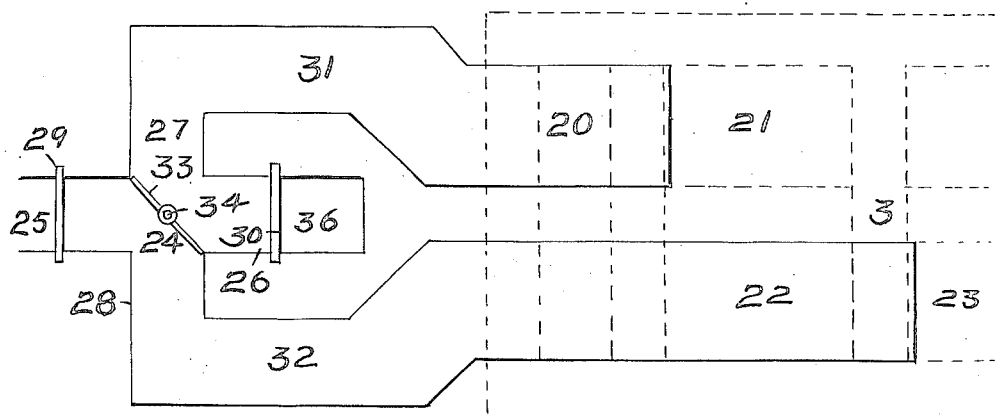
Figure 8:
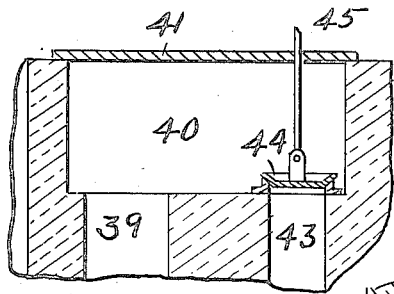
Figure 7:
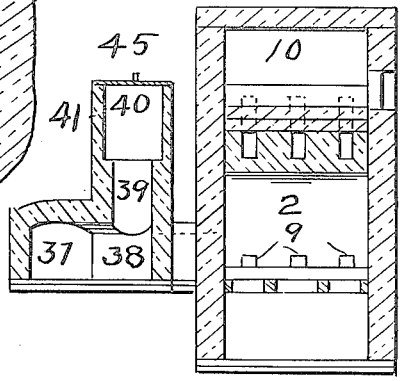

Referring to the accompanying drawings, Figure 1 is a longitudinal section of a furnace embodying my invention, the section being taken on the line I—I, Fig. 2, and a portion being broken away; Fig. 2, a horizontal section on the line II—II, Fig. 1; Fig. 3, a cross-section on the line III—III, Fig. 2, a portion being broken away at the left; Fig. 4, a cross-section on the line IV—IV, Fig. 2; Fig. 5, a horizontal section on the line V—V, Fig. 1; and Fig. 6, a diagrammatic plan view of my invention with a portion at the right broken away. Figs. 7 and 8 are sections on the lines VII—VII and VIII—VIII, respectively, on Fig. 2.

On the drawings, 1 and 2 designate two checker-chambers, one behind the other, containing checker-work constructed in any suitable manner. The checker-work illustrated is merely to show the presence of a checker-work or other heat-absorbing arrangement. The chambers 1 and 2 are separated by the vertical transverse wall 3. 4 is a preliminary combustion chamber separated from the chamber 1 by the vertical wall 5, and 6 is a second preliminary combustion chamber separated from the chamber 2 by the vertical wall 7. The chambers 1 and 4 are connected at their lower portions by the flues 8 in the wall 5, and the chambers 2 and 6 by the flues 9 in the wall 7.

10 represents the furnace chamber which lies directly above the chambers 1, 2, 4, and 6. One end of the furnace chamber communicates with the chamber 4 by means of the vertical flues 11, and the other end of the furnace chamber communicates with the chamber 6 by means of the vertical flues 12. The end of the furnace chamber 10 having the flues 11 is in communication with the checker-chamber 1 by means of air flues comprising the horizontal flues 13 which are connected at one end with the vertical flues 14 leading to the furnace chamber 10 between adjacent gas flues 11, and at the other end with the vertical flues 15 leading to the top of the checker-chamber adjacent to the wall 3. The end of the furnace chamber having the flues 12 communicates with the checker-chamber 2 by means of air flues comprising the horizontal flues 16 which are connected at one end with the vertical flues 17 leading to the furnace chamber between adjacent gas flues 12, and at the other end with the vertical flues 18 leading to the top of the checker-chamber 2 adjacent to the wall 3.

Several pipes 19 for supplying natural gas have their delivery ends opening into the chambers 4 and 6 and constitute gas burners.

20 is a passage lying beneath the chamber 4 and opening into the chamber 21 beneath the checker-chamber 1 and in direct communication therewith at its top, and 22 is a second passage parallel with the passage 20 and lying beneath the chambers 4 and 1 and opening into the chamber 23 which is in direct communication with the chamber 2.

24 is a vertical valve chamber communicating with the stack flue 25, the air-supply flue 26, and the diametrically opposite flues 27 and 28. 29 and 30 are vertically-slidable dampers in the flues 25 and 26, respectively. 31 is a flue leading from the flue 27 to the flue 20, and 32 is a flue leading from the flue 28 to the flue 22. 33 is a butterfly valve provided with the operating stem 34 which has the handle 35. The valve is constructed and arranged in one position (Fig. 2) to connect the flue 25 to the flue 27, and the flue 26 to the flue 28, and in a second position (Fig. 6) to connect the flue 25 to the flue 28, and the flue 26 to the flue 27. 36 is a pit between the adjacent walls of the flues 31 and 32 for leading air to the flue 26 and beneath the damper 30.

37 is a passage running along one side of the construction so far described for supplying producer or other artificial gas to the chambers 4 and 6. The supply passage 37 communicates by the passage 38 with the vertical passage 39 which opens into the horizontal passage 40 in the box 41. The bottom of the chamber 6 is connected to the passage 40 by way of the horizontal passage 42 and the vertical passage 43. In the latter passage is the mushroom valve 44 seating downwardly to close the passage 43. 45 is a stem extending through the top of the box 41 for operating the valve 44.

46 is a second box through which gas from the passage 37 is transferred to the chamber 4 in the same manner that gas is transferred through the box 41 from the passage 37 to the chamber 6. On Fig. 2, the numerals 38 to 45 accompanied with prime marks indicate with respect to the course of the gas to the chamber 4 parts having the same structure and function as are indicated by the said numerals alone. When the burners 19 are in use the valves 44 and 44' are both on their seats.

The operation with the valve 33 as shown on Figs. 1 and 2 is as follows: Gas is supplied to the combustion chamber 6 to which air is supplied through the passages and flues 26, 28, 32, and 22, the chamber 23, the lower portion of the checker-chamber 2, and the flues 9. The gas is partially consumed in the chamber 6 and passes therefrom up the flues 12 to the furnace chamber 10 where it meets more air which enters the latter chamber by way of the checker-chamber 2, and the flues 18, 16, and 17. The combustion of the gas is completed in the furnace chamber 10, the air and the gases being intimately mixed since the air enters between the inlets for the burning gases. From the furnace chamber part of the hot waste gases pass down the gas flues 11, entering the combustion chamber 4 directly and then through the flues 8 into the checker-chamber 1, in which they commingle with the other portion of the waste gases passing through the flues 14, 13, and 15. From the chamber 1 the waste gases enter the chamber 21 and pass to the stack flue 25 by way of the flues and passages 20, 31 and 27. It being assumed that the checker-chamber 2 and the preliminary combustion chamber 6 were heated previous to the operation just described, it is seen that the fuel gas and air entering the chamber 6 are heated therein and that the air is heated by the checker-work in the chamber 2 before it enters the chamber 6. Combustion is begun in the chamber 6 and is finished in the furnace chamber 10 where the partially consumed gas meets a fresh supply of highly heated air which has traversed the entire checker-chamber 2. At the same time, the waste gases are heating the checker-chamber 1 and the combustion chamber 4. When the checker-work in the chamber 1 has been sufficiently heated and most of the heat in the chamber 2 has been extracted by the air, the valve 33 is rotated to the position shown in Fig. 6, the supply of gas to the chamber 6 is cut off, and the supply of gas to the chamber 4 is turned on. Air then reaches the chamber 21 by way of the passages and flues 26, 27, 31, and 20. From the chamber 21, the air passes into the checker-chamber 1, from which a part enters the chamber 4 through the flues 8, the rest entering the furnace chamber through the flues 15, 13, and 14. The air and gas are partially burned in the chamber 4 and then pass up the flues 11 and are completely consumed in the presence of the heated air entering the chamber 10 from the flues 14. From the chamber 10 the waste gases pass down the gas flues 12 and the chamber 6 and the air flues 17, 16, and 18 to the chamber 2 and heat the checkerwork therein. From the chamber 2 the waste gases pass down to the chamber 23 and reach the stack flue 25 by way of the passages 22, 32, and 28.

When the checker work in the chamber 2 has been sufficiently heated, the valve 33 is moved to the position shown in Figs. 1 and 2; the supply of gas to the chamber 4 is cut off and the supply of gas to the chamber 6 is turned on, when the first part of the described operation is repeated. The valve 33 is alternately reversed and the gas supply is alternately supplied to the chamber 4 and 6 and cut off therefrom in the manner described while the furnace is in use.

When it is desired to burn artificial gas, the supply of gas through the pipes 19 is cut off and one of the valves 44, 44' is lifted to admit the gas to the chamber 4 or 6. The valve 33 is operated as already described. If the valve 33 is as in Figs. 1 and 2, the valve 44 is lifted to supply gas to the chamber 6, the course of the air and gas being as already described. When the valve 33 is reversed to the position shown on Fig. 5, the valve 44' is unseated and the valve 44 seated, thereby admitting gas to the chamber 4 and cutting it off from the chamber 6. The operation is the same as with the gas entering by the pipes 19.

I claim—

1. In a regenerative furnace, a furnace-chamber, a checker-chamber beneath the same, a preliminary combustion-chamber at the side of the checker-chamber, means for supplying gas to the preliminary combustion-chamber, means for supplying air to the bottom of the checker-chamber, means for supplying air from the lower portion of the checker-chamber to the preliminary combustion-chamber, means for conducting burning gases from the latter chamber to the furnace-chamber, and means for conducting air from the top of the checker-chamber to the furnace-chamber and into intimate contact with the said burning gases therein.

2. In a regenerative furnace, a furnace-chamber, a regenerator-chamber beneath the same, a preliminary combustion-chamber at the side of the latter chamber, means for conducting gases to the preliminary combustion-chamber, means for conducting partially-regenerated air into the latter chamber, passages for conducting the burning gases from the top of the preliminary combustion chamber to the furnace-chamber, and passages conducting fully-regenerated air from the regenerator-chamber to the furnace-chamber and into intimate contact with the said burning gases.

Signed at Pittsburgh, Pa., this 12th day of May 1915.

HORACE E. SMYTHE.